July 5, 1927.
H. K. SANDELL
1,634,852
ELECTRIC MOTOR
Filed March 27, 1924
2 Sheets-Sheet 1
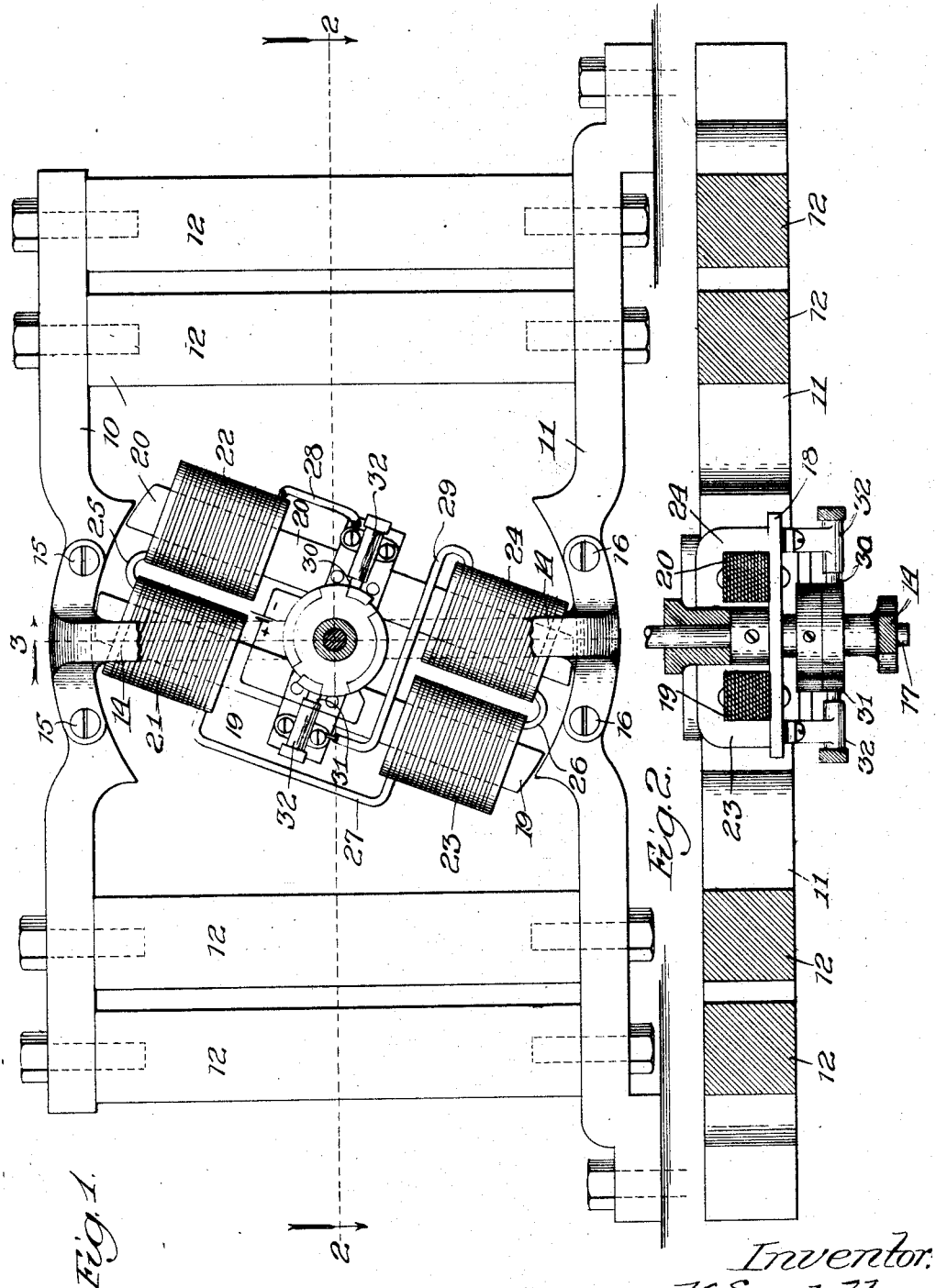
Inventor.
Henry K Sandell, July 5, 1927.

H. K. SANDELL

ELECTRIC MOTOR

Filed March 27, 1924   2 Sheets-Sheet 2

1,634,852

Inventor:
Henry K. Sandell,
By Dyrenforth, Lee, Chritton & Wiles,
Att'ys

Patented July 5, 1927.

1,634,852

UNITED STATES PATENT OFFICE.

HENRY K. SANDELL, OF CHICAGO, ILLINOIS.

ELECTRIC MOTOR.

Application filed March 27, 1924. Serial No. 702,298.

This invention relates to electric motors and the like and is fully described in the following specification and shown in the accompanying drawings in which:

Figure 1 is an end elevation of a motor embodying the invention;

Fig. 2 is a horizontal section on the line 2—2 of Fig. 1;

Figure 3:
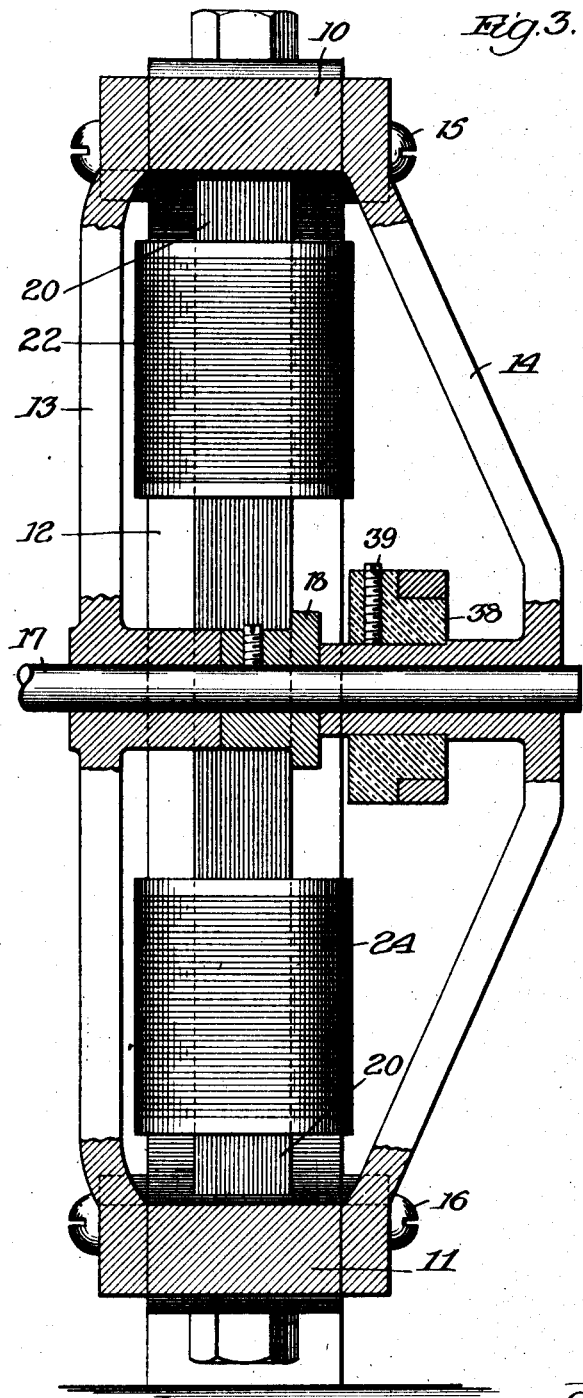
Fig. 3 is an enlarged vertical section on the line 3 of Fig. 1.
Figure 4:
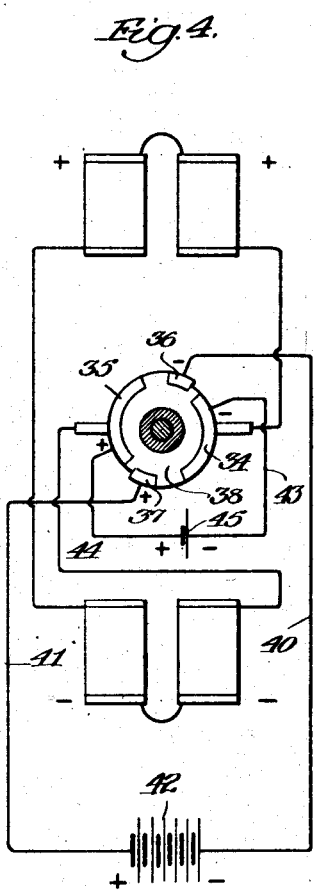
Fig. 4 is a wiring diagram of the motor.

This motor is a modification of the one shown in my Patent No. 1,578,096, granted March 23, 1926.

The embodiment illustrated comprises a frame having top and bottom pole pieces 10 and 11 which are connected by field cores 12 which may either be of the fixed magnet type or of the wound electro-magnet type as will readily be understood.

Yoke members 13 and 14 are connected to the top and bottom pole pieces by means of screws 15 and 16 and in these is journalled the shaft 17.

This shaft carries a member 18 to which are secured the armature cores or bar magnets 19 and 20 which are preferably made up of a series of laminated plates as shown in Fig. 3, which are soft iron, some of them having hardened or tempered outer ends which serve to increase the retentivity of these bar magnets. Armature coils 21, 22, 23 and 24 are wound about the ends of these cores which are spaced some distance apart as shown in Fig. 1. The coils 21 and 22 are connected together by a lead 25, while a lead 26 connects the coils 23 and 24, and the free ends of the coils 21 and 23 are connected by means of a wire 27. The free ends of the coils 22 and 24 are connected through leads 28 and 29 to the brushes 30 and 31 respectively, the latter being mounted in holders 32.

These brushes bear upon the segments 34, 35, 36 and 37 which are mounted upon the insulating block 38, the latter being mounted on the yoke 14 and secured thereon by a screw 39.

The segments 36 and 37 are connected through leads 40 and 41 to a source of current supply 42, while the segments 34 and 35 are similarly connected through the leads 43 and 44 to a source 45 of relatively low voltage current supply.

As the armature revolves the brushes 30 and 31 rotate in a clockwise direction as shown in Fig. 1. After these brushes make contact with the segments 36 and 37, current from the source 42 flows therethrough energizing the coils 21, 22, 23 and 24 which are so wound as to magnetize the cores 19 and 20 in the same direction. As the armature continues to revolve, the brushes 30 and 31, will engage the segments 34 and 35 and the current from the low voltage supply 45 will tend to maintain the magnetization of the cores 19 and 20 with the same polarity as that just received from the source of current 42.

As the armature continues to revolve the brushes 30 and 31 will then engage the segments 36 and 37 in a position opposite to that which has just been described, and current will flow through the armature coils 21, 22, 23 and 24 in a reverse direction, thereby de-energizing the cores 19 and 20 and remagnetizing them with reverse polarity. This reverse polarity of the armature cores takes place substantially at the time these cores are passing out from under the pole pieces and the polarity after reversal of the cores is the same as that of the pole pieces adjacent thereto so that these pole pieces then act to repel the near ends of the cores while the opposite ends of the cores are attracted, thereby causing the motor shaft to rotate.

I claim:

1. In an electric motor, an armature, field members located about said armature, said field members having opposed pole pieces, windings on said armature, relative high voltage means for supplying current to the armature windings as they pass the pole pieces, and means for continuing the armature current comprising a lower voltage supply.

2. In an electric motor, an armature comprising two parallel bars of magnetic material lying one on each side of the axis of the armature, windings on said bars, and means for energizing said windings on each half revolution of the armature.

3. In an electric magnet, a core, windings thereon, means for energizing said windings, means for continuing said energization with a lower voltage than that which was primarily applied to energize said magnet, and means for rapidly repeating said energization.

In witness whereof I have hereunto set my hand and seal this 17th day of March 1924.

HENRY K. SANDELL.